(12) United States Patent
Hashimoto (10) Patent No.: US 7,055,310 B2
(45) Date of Patent: Jun. 6, 2006

(54) SYSTEM FOR DETECTING DETERIORATION OF A PURIFIER UTILIZING A NON-LINEAR FILTER

(75) Inventor: Eiji Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 44 days.

(21) Appl. No.: 10/961,402

(22) Filed: Oct. 12, 2004

(65) Prior Publication Data

US 2005/0091966 A1    May 5, 2005

(30) Foreign Application Priority Data

Oct. 21, 2003    (JP) .............................. 2003-360939

(51) Int. Cl.
*F01N 3/00*    (2006.01)

(52) U.S. Cl. .............................. 60/277; 60/274; 60/276; 701/103; 701/109

(58) Field of Classification Search .................. 60/274, 60/276, 277, 285; 701/103, 109
See application file for complete search history.

(56) References Cited

U.S. PATENT DOCUMENTS 5,426,937 A * 6/1995 Ohuchi et al. ................ 60/276
5,557,933 A * 9/1996 Numata et al. ................ 60/274
6,006,153 A * 12/1999 Stander et al. .............. 701/109
6,301,881 B1 * 10/2001 Kumar ......................... 60/274
6,694,243 B1 * 2/2004 Shi et al. .................... 701/114

FOREIGN PATENT DOCUMENTS

JP    2003-193898    7/2003

* cited by examiner

*Primary Examiner*—Binh Q. Tran
(74) *Attorney, Agent, or Firm*—Arent Fox PLLC (57) ABSTRACT

A high precision deterioration determination device for an exhaust gas purifier of an engine is provided. The engine includes an exhaust gas purifier disposed in an exhaust pipe of the engine, and a downstream exhaust gas sensor disposed in the exhaust pipe on the downstream of the purifier for generating outputs corresponding to components of an exhaust gas. The electronic control unit controls an air/fuel ratio of the engine to a predetermined value based on the outputs of the downstream exhaust gas sensor. The control unit is programmed to perform a non-linear filtering to extract rectangle-shaped waveform components from the outputs of the downstream exhaust gas sensor. The control unit subtracts the rectangle-shaped waveform components from the sensor outputs to extract noise components representing a degree of the catalyst deterioration.

15 Claims, 10 Drawing Sheets

SYSTEM FOR DETECTING DETERIORATION OF A PURIFIER UTILIZING A NON-LINEAR FILTER

BACKGROUND OF THE INVENTION

The present invention relates to an apparatus for determining a state of deterioration of a purifying performance of a purifier for purifying exhaust gas from an internal-combustion engine (hereinafter referred to as an "engine").

As one of conventional techniques for determining a deterioration state of a purifier for purifying exhaust gas produced by combustion of an air-fuel mixture in an engine, there is, for example, an approach of determining a deterioration state of a purifier by the use of a linear filter. This approach is disclosed in the Japanese Patent Application Unexamined Publication (Kokai) No. 2003-193898. According to this approach, a process with a linear filter (for example, a bandpass filter) is first performed on an output SVO2 of an oxygen density sensor (O2 sensor) disposed downstream of the purifier. The value of the filtered output is used to determine the deterioration of the purifier.

In general, an exhaust gas purifier of an engine reduces NOx in the exhaust gas through an O2 storage effect and oxidizes unburned HC, CO. When the O2 storage effect deteriorates, purification of the exhaust gas becomes insufficient and a variation in the air-fuel ratio on the upstream side of the purifier appears as a variation in the outputs of the O2 sensor. In other words, a fine noise-like vibration becomes apparent in the waveform of the output SVO2 of the O2 sensor as the purifier deteriorates.

The above-referenced approach uses the SVO2 properties caused by deterioration and compares and analyzes the frequency components of the SVO2 applying a fast Fourier transform (FFT) to the SVO2. As a result of such analysis, it is observed that there is a frequency range in which a power spectrum increases as the purifier deteriorates. In other words, if a certain frequency component that correlates with the deterioration can be extracted, deterioration of the purifier can be determined. Based on this observation, the above-referenced approach uses a bandpass filter to extract from the SVO2 only the frequency component that increases as the purifier deteriorates so as to utilize the extracted frequency component as a parameter for determining the deterioration.

However, according to the above-referenced approach, from time to time a new catalyst (hereinafter referred to as a "fresh catalyst") and a catalyst having a normal purifying performance (hereinafter referred to as a "normal catalyst") may not be distinguished from a catalyst having an insufficient purifying performance (hereinafter referred to as a "NG catalyst").

The fresh catalyst characteristically results in SVO2 of a rectangular waveform. The rectangular waveform includes an edge-shaped wave as well as a step wave. It is known that a step-shaped waveform with edges includes various frequency components.

In the above-referenced approach, the filtering process is performed to extract the components associated with the deterioration from the SVO2. In other words, the components that are regarded to represent the characteristics of the fresh catalyst must be removed. However, the rectangular wave that is formed by the various frequency components cannot be completely removed with the bandpass filter. Similarly, any other linear filter, which is designed to provide a bandpass by using a frequency range, cannot remove such rectangular waveform completely. Therefore, the above-referenced approach includes a problem that even when the catalyst is normal a part of the SVO2 waveform may pass through the bandpass filter and output a discrimination parameter.

Thus, there exists a need for a technique for appropriately extracting a rectangle-shaped waveform component that is characteristic to the fresh catalyst. Accordingly, it is an object of the present invention to provide a high precision deterioration determination device for an exhaust gas purifier of an engine.

SUMMARY OF THE INVENTION SUMMARY OF THE INVENTION

The present invention provides a purifier deterioration determining apparatus for an engine. The engine includes an exhaust gas purifier disposed in an exhaust pipe of the engine, and an exhaust gas sensor disposed in the exhaust pipe at the downstream of the purifier for generating outputs reflecting components included in the exhaust gas from the engine. The apparatus includes a controller for controlling an air/fuel ratio of the engine to a predetermined value based on the outputs of the downstream exhaust gas sensor. The apparatus also includes means for performing a non-linear filtering to extract rectangle-shaped waveform components, which are characteristic to the fresh catalyst, from the outputs of the downstream exhaust gas sensor during an operation under an air/fuel ratio control. The apparatus further includes means for subtracting the rectangle-shaped waveform components from the sensor outputs to extract noise components representing a degree of the catalyst deterioration. The apparatus also includes means for determining deterioration of the purifier.

In general, a non-linear filter is defined as a function of outputting a median value out of all sampling values over a certain time period. A linear filter conventionally multiplies a coefficient to components of an input signal to smooth the components. In contrast, the non-linear filter selects one of the components of the input signal and outputs it as it is. When no noise is contained in the input signal at all, the input signal waveform is output as it is because the sorting order of the sampling values is unchanged from the original order of the input signal.

In other words, the non-linear filtering is superior to the linear filtering in terms of performance of extracting the original signal having a rectangle-shaped waveform. Thus, a fresh catalyst and a deteriorated catalyst can be distinguished. By applying a non-linear filtering, it becomes possible to extract from the sensor output the noise component that represents a degree of the catalyst deterioration. It is preferable that a DW-MTM (Double Window-Modified Trimmed Mean) filter is applied to the non-linear filtering. However, the non-filtering process is not limited to such a scheme. Any appropriate scheme may be used depending on the type, the characteristics and/or the like of the engine and the purifier to which the purifier deterioration determination device of the present invention is applied.

The parameter indicating deterioration of a purifier is a value produced by squaring noise components obtained by the noise component extracting means and calculating with sequential statistical algorithm. Although it is preferable that the least squares method is applied to the sequential statistical algorithm, the algorithm is not limited to the least squares method.

The purifier deterioration determining means determines the deterioration of the purifier using the discrimination parameter. It is desirable that the deterioration determination criterion is equal to or more than 1 Hz in a frequency domain. This criterion is based on the observation in the testing done by the inventors. Specifically, it is observed that the frequency component of the sensor output value is equal to or less than 1 Hz in case of a fresh catalyst. However, the method for defining the deterioration determination criterion is not limited to this approach. Any appropriate method may be selected according to the type and/or the characteristics of the engine and the purifier to which the purifier deterioration determination device of the present invention is used.

DESCRIPTION OF THE PREFERRED EMBODIMENTS

Figure 1:
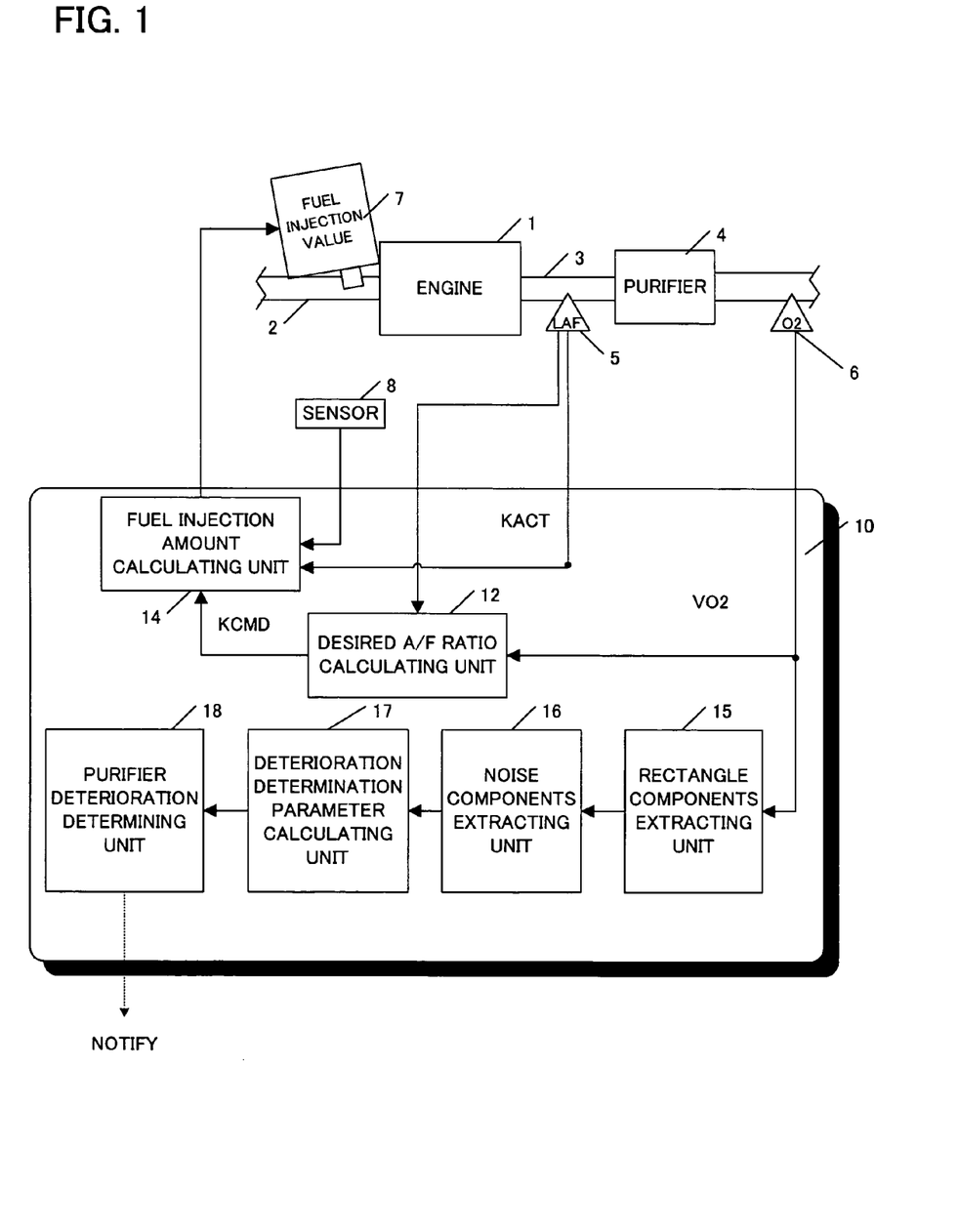
FIG. 1 is a schematic diagram showing an overall system structure of a deterioration determining device for an exhaust gas purifier of an engine in accordance with one embodiment of the present invention.

FIG. 1 is a schematic diagram showing an overall system structure of a device to which one embodiment of the present invention is applied. In FIG. 1, exhaust gas produced by combustion of air-fuel mixture in each cylinder of an engine 1 is collected in a common exhaust pipe 3 in the neighborhood of the engine 1 and then emitted to the atmosphere through the exhaust pipe 3. A purifier 4 is mounted in the exhaust pipe 3. The purifier 4 includes, for example, a three-way catalytic converter for purifying the exhaust gas.

In order to detect an operating condition of the engine 1, an intake pressure sensor for measuring an intake pipe absolute pressure (PBA) is disposed upstream of an intake pipe 2. Additionally, sensors including an engine rotational speed (NE) sensor and a cooling water temperature sensor are provided to the engine 1. In FIG. 1, these sensors are represented collectively as a generic sensor 8. Outputs of the sensor 8 are provided to an electronic control unit (ECU) 10.

Basically, in the present embodiment, an air/fuel ratio control is performed to control the air/fuel ratio of the engine 1 (that is, the air/fuel ratio of the mixture to be burned in the engine 1) so as to secure an optimal purifying performance of the purifier 4. A deterioration determination for the purifier is performed in parallel with this air/fuel ratio control.

In order to perform such process, an air/fuel ratio (LAF) sensor 5, which is a first exhaust gas sensor, is disposed in the exhaust gas pipe 3 on the upstream side of the purifier 4 (more specifically, where the exhaust gas from each cylinder of the engine 1 is collected) and an oxygen density sensor (hereinafter referred to as an "O2 sensor"), which is a second exhaust gas sensor, is disposed in the exhaust gas pipe 3 on the downstream side of the purifier 4. It should be noted that a second purifier for removing primarily NOx from the exhaust gas may be additionally disposed downstream of the O2 sensor.

The O2 sensor 6 generates an output SVO2 representing a detection value for the density of the oxygen in the exhaust gas that has passed through the purifier 4. When the oxygen density of the exhaust gas (the air/fuel ratio) is close to a stoichiometric air/fuel ratio, the output SVO2 of the O2 sensor exhibits a desirably-sensitive change almost in proportion to the density of the oxygen in the exhaust gas. When the oxygen density is not close to the stoichiometric air/fuel ratio, the SVO2 keeps an almost constant level.

The air/fuel ratio sensor (LAF sensor) 5 generates an output KACT representing a detection value of the air/fuel ratio of the exhaust gas that is going into the purifier. The output KACT of the LAF sensor 5 generates an output of a level proportional to the air/fuel ratio extending over a wide range.

The outputs of these sensors 5, 6 are provided to the ECU 10, which performs the air/fuel ratio control and/or the deterioration determination process based on those outputs.

The ECU 10 is composed of a computer. The ECU 10 has a ROM for storing computer programs and data, a RAM for temporarily storing programs and data required at a run time and providing a working space for calculations, a CPU for executing the programs, an input interface for processing input signals from various sensors and a driving circuit for sending control signals to a fuel injection valve 7 and other elements. The signals from each of the above-described sensors are received by the input interface and processed in accordance with the programs stored in the ROM. With such a hardware structure, the ECU 10 is illustrated in FIG. 1 in terms of functional blocks.

The ECU 10 includes a desired air/fuel ratio calculating unit 12 for calculating a desired air/fuel ratio KCMD of the engine 1 (that is, a desired value of the air/fuel ratio that is detected by the LAF sensor 5) and a fuel injection amount calculating unit 14 for calculating a fuel injection amount in accordance with the desired air/fuel ratio KCMD. These units perform the air/fuel ratio control. A specific control scheme for the air/fuel ratio control can be referred to in the Japanese Patent Application Unexamined Publication (Kokai) No. 2001-182528 and the Japanese Patent Application Unexamined Publication (Kokai) No. 2000-230451.

The ECU 10 also includes a rectangle-shaped waveform components extracting unit (hereinafter referred to as a "rectangle extracting unit") 15, a noise components extracting unit (hereinafter referred to as a "noise extracting unit") 16, a deterioration discrimination parameter calculating unit (hereinafter referred to as a "parameter calculating unit") 17 and a purifier deterioration determining unit (hereinafter referred to as a "deterioration determining unit") 18. These units determine the deterioration condition of the purifier through use of the O2 sensor output SVO2. The details will be described later.

Figure 2:
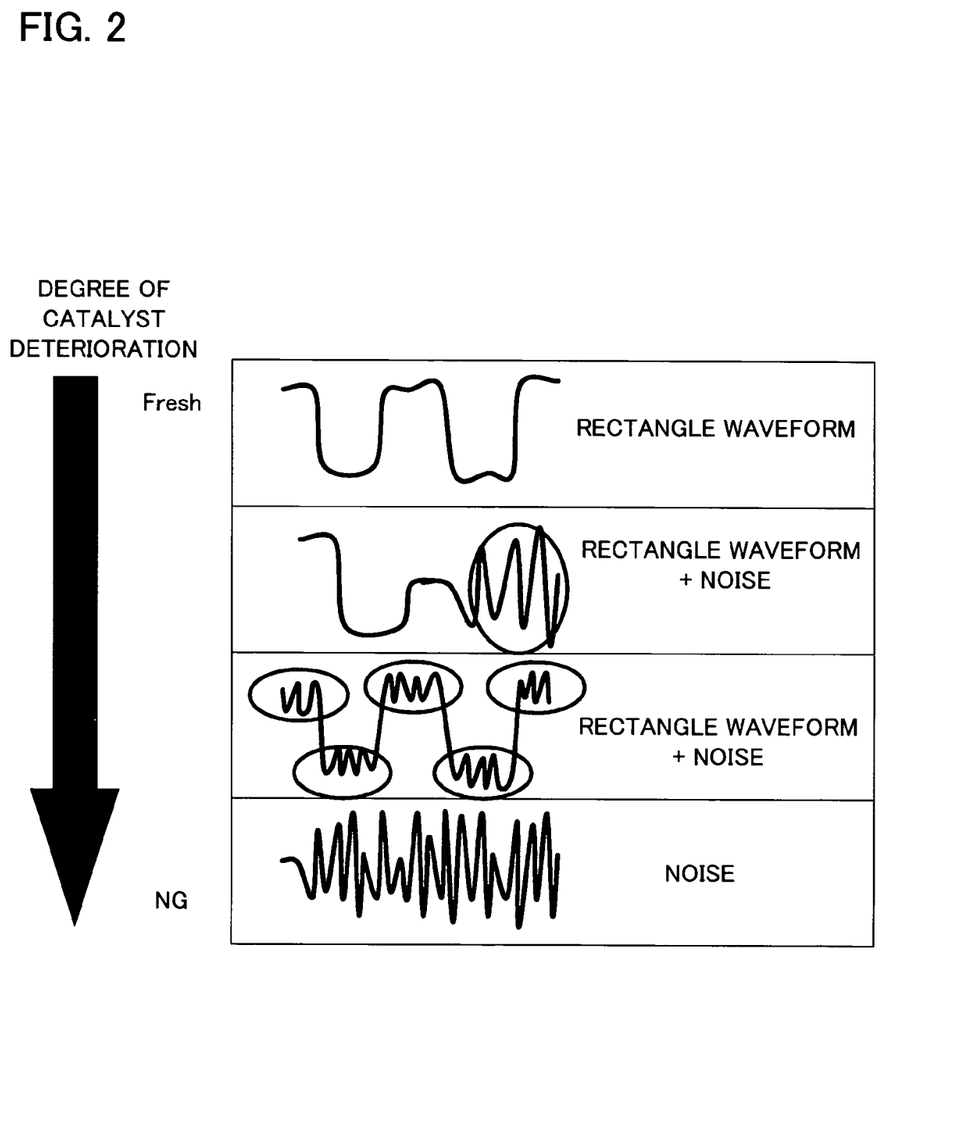
FIG. 2 schematically shows changes in SVO2 values caused by catalyst deterioration.

Now, a principle of the deterioration determination of the purifier according to the present invention will be described. In general, an exhaust gas purifier of an engine reduces NOx in the exhaust gas by means of an O2 storage effect of the purifier and oxidizes unburned HC, CO before emitting the exhaust gas. When the O2 storage effect deteriorates, the purification of the exhaust gas becomes insufficient and a variation in air-fuel ratio on the upstream side of the purifier will appear as a variation in outputs of the O2 sensor. In other words, a fine vibration becomes apparent in the waveform of the output SVO2 of the O2 sensor as the purifier deteriorates. As shown in FIG. 2, the SVO2 exhibits a rectangle-shaped wave in case of a fresh catalyst. As the purifier deteriorates, fine vibration grows gradually and results in noise in the entire range of SVO2 in the case of the NG catalyst having an insufficient purifying performance. In other words, the noise components contained in the O2 sensor output SVO2 indicate the deterioration degree of the purifier. In the present invention, therefore, the noise components are extracted from the SVO2 and the deterioration is determined using the signal of the extracted noise components.

Besides, certain conditions need to be satisfied for performing such deterioration determination process. The determination process is started, for example, when variance of the load of the engine, variance of the output of the LAF sensor, or flow rate of the exhaust gas exceeds predetermined values respectively. The determination process is suspended when such parameters do not reach the predetermined values respectively. The details of such control technique is described in the above-referenced Kokai No. 2003-193898.

Figure 3:
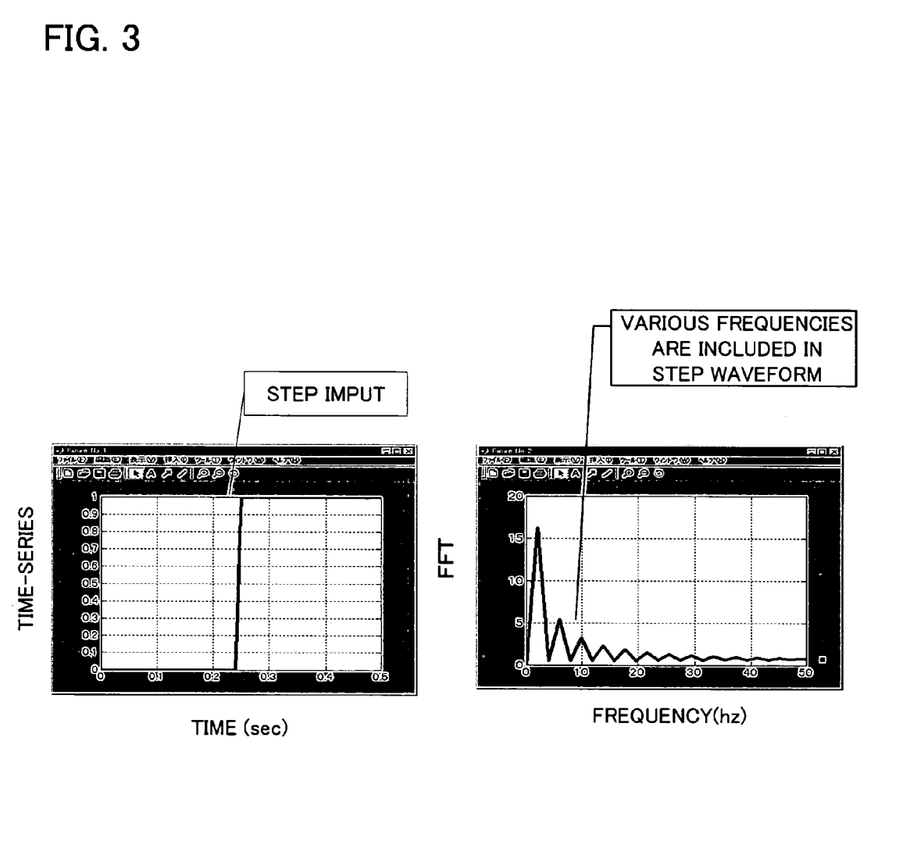
FIG. 3 is a schematic diagram showing a result of applying a FFT to a step waveform.

The Kokai No. 2003-193898 discloses a control scheme of using a bandpass filter to extract the frequency components that increase as the deterioration progress. However, it should be noted that the rectangle-shape waveform component (hereinafter referred to as "rectangle components"), which is to be removed from the SVO2, is a step-shaped waveform as shown in FIG. 2. FIG. 3 is a schematic diagram showing a result of applying a fast Fourier transform (FFT) to the step waveform. The step waveform is formed by various frequency components. For that reason, such linear filter as a bandpass filter, which defines a bandpass area with a frequency range, cannot completely remove the rectangle components including various frequency components.

Figure 4:
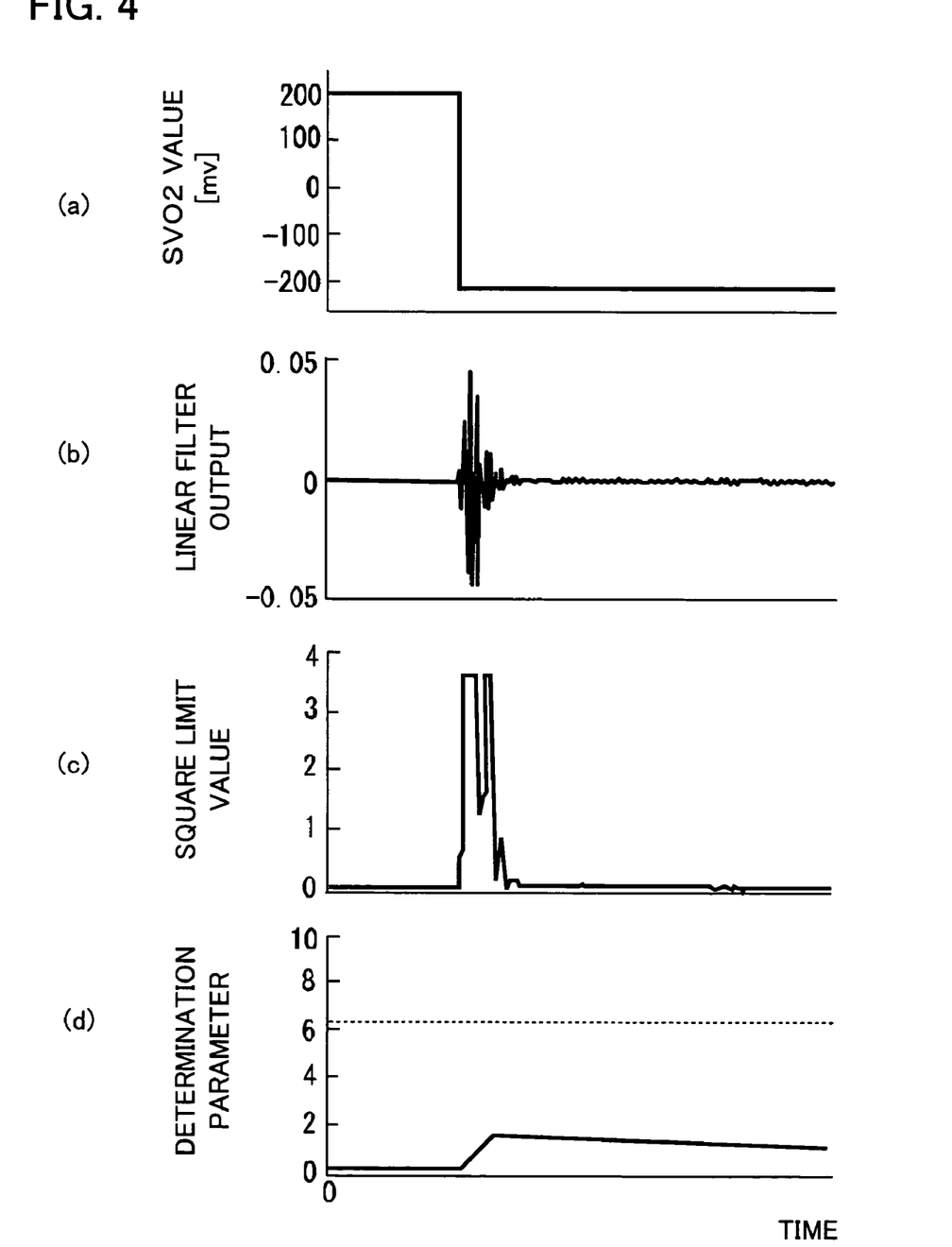
FIG. 4 schematically shows that an output of a deterioration discrimination parameter becomes high through a linear filtering process when a SVO2 value is in a step shape.

FIG. 4 illustrates the above-described defect of the linear filter more specifically. FIG. 4 illustrates (a) an input value, (b) a linear filter output, (c) a square limit value and (d) a discrimination parameter. It is observed from (b) that the components corresponding to the bandpass frequency range are left in the result of linear filtering of the step-wave input of (a). According to the discrimination parameter determining method disclosed in the Kokai No. 2003-193898, the square limit value for the value of (b) is produced as illustrated in (c) whose integral value as illustrated in (d) is used as the discrimination parameter. It is observed that the deterioration discrimination parameter continues to be a high value due to the influence of the components (b) that could not be removed by the linear filtering process. In this example, the input value is a complete step wave, which simulates the SVO value in association with the fresh catalyst. In other words, according to the conventional approach, even when the fresh catalyst is used, a filter output may sometimes be generated as a result of linear filtering, which may produce an unfavorable influence upon the deterioration determination.

Accordingly, the present invention uses a non-linear filter that removes impulse noise, preserves edges and preserves rectangle components as a root waveform. The term "root waveform" refers to the waveform that is common to an input waveform before it is filtered and an output waveform after it is filtered.

Figure 5:
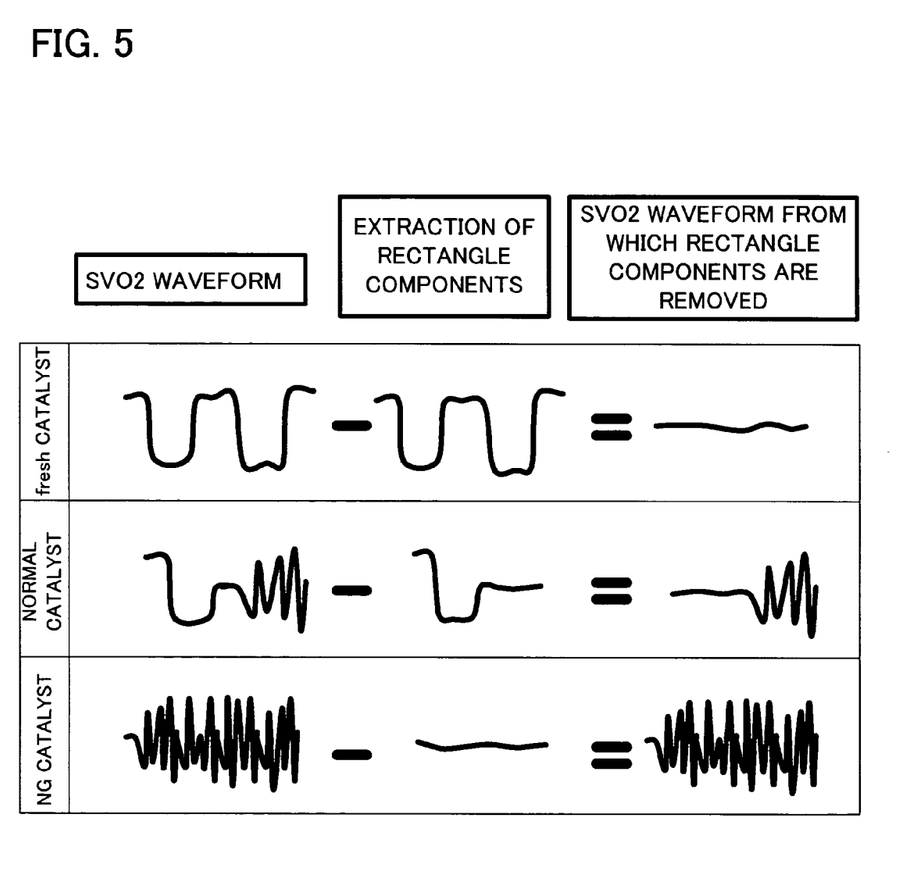
FIG. 5 is a schematic diagram to show a method of extracting noise components in accordance with the present invention.

FIG. 5 schematically illustrates a scheme of extracting noise components in accordance with the present invention. First, a rectangle component is extracted from the input waveform by means of the non-linear filtering. Secondly, the extracted rectangle component is subtracted from the O2 sensor output SVO2 to obtain a noise component. FIG. 5 shows, from the top to the bottom, patterns of the SVO2 waveform of a fresh catalyst, a normal catalyst and an NG catalyst. As shown in FIG. 5, the rectangle component representing a root signal can be extracted with precision irrespective of the presence of noise, which in turn is used to obtain a noise component that is effective for discriminating a deterioration.

In this embodiment of the present invention, a DW-MTM filter is used as a non-linear filter. The DW-MTM is a non-linear filter and has a capability of removing the impulse noises and preserving the edges, which is characteristic to the non-linear filter. The DW-MTM additionally has a capability of removing Gaussian distribution noises. Therefore, the DW-MTM can remove such waveform that has a relatively small amplitude and certain periodicity.

Figure 6:
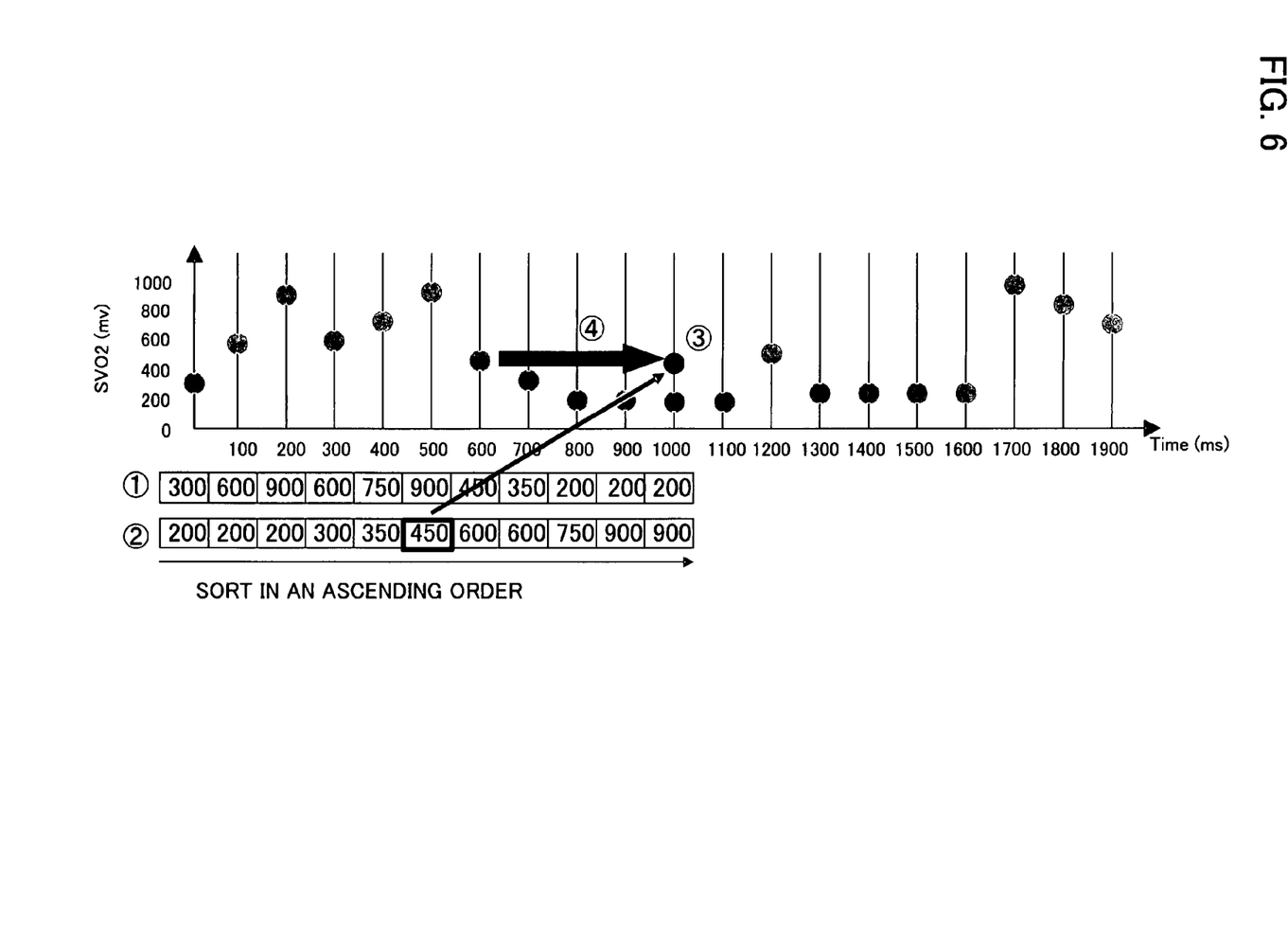
FIG. 6 shows a processing procedure of a non-linear filter DW-MTM applied in one embodiment of the present invention.

FIG. 6 shows a processing procedure of the DW-MTM. In the example in FIG. 6, the present time is at 1000 msec and the number of the buffers is eleven. The process is carried out in accordance with the following procedure (each of the following procedure numbers corresponds to each number in a circle in FIG. 6):

(1) perform buffering in a predetermined time period (11 buffers, which is equivalent to 1000 msec, in this example).
(2) sort the buffered values in an ascending order.
(3) output a median value that is located in the center of the ordered values (the sixth value in this example).
(4) take the median value as a filter output value at the current time (1000 msec in this example).

By performing this process over the whole range in the time axis, the root waveform can be extracted from the original waveform.

Figure 7:
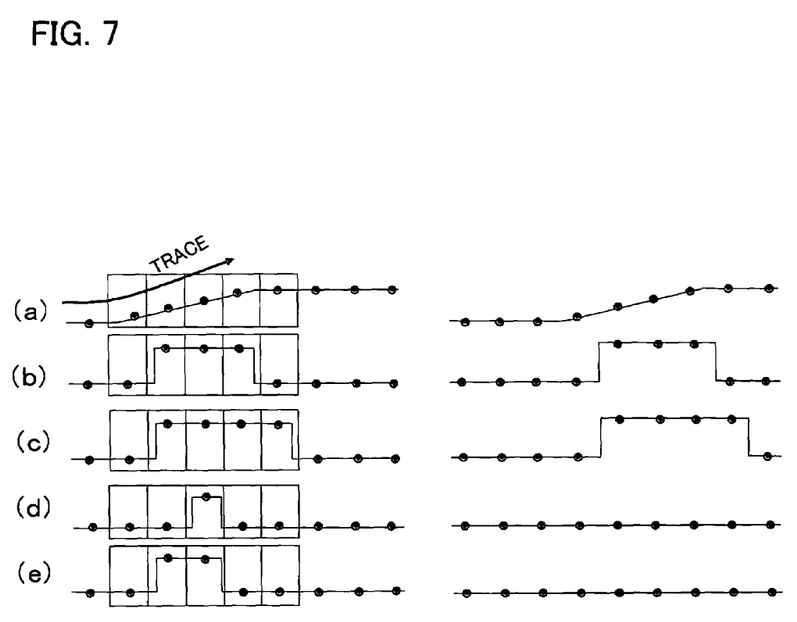
FIG. 7 schematically shows characteristics of a DW-MTM filter.

FIG. 7 shows characteristics of the DW-MTM filter. The number of the buffers is five in the example of FIG. 7. Five types of original signal waveforms (a) to (e) are shown on the left and the filtered waveforms are shown on the right. Characteristics of the filtering process for each of the waveforms is described, followed by a summary of the characteristics of the DW-MTM filter.

In (a), the values in the buffers of the filter increase monotonously, and the waveform is regarded as a root signal, so that it remains unchanged (similarly, unchanged in case of monotonous decrease). It should be noted that a term of "period" here means a period from rising of the waveform to the falling of the waveform to the original state.

In (b), the waveform is regarded as a root signal because the majority of the values in the buffers of the filter remain in a half-period state, that is, a state wherein the waveform has risen and has not fallen. The waveform is unchanged under this situation, and the waveform is regarded as a root signal.

In (d) and (e), because the number of values in a half-period state is less than half of the total number of the buffer, the median value is not taken. These signals are removed because they are regarded as a noise. Thus, it is characteristic of the DW-MTM filter that a moderate variance is preserved and a small variance is removed. Besides, the phase of the output is delayed by slightly less than a half of the number of the buffers (specifically, 2 in case of 5 buffers, 5 in case of 11 buffers etc.).

Figure 8:
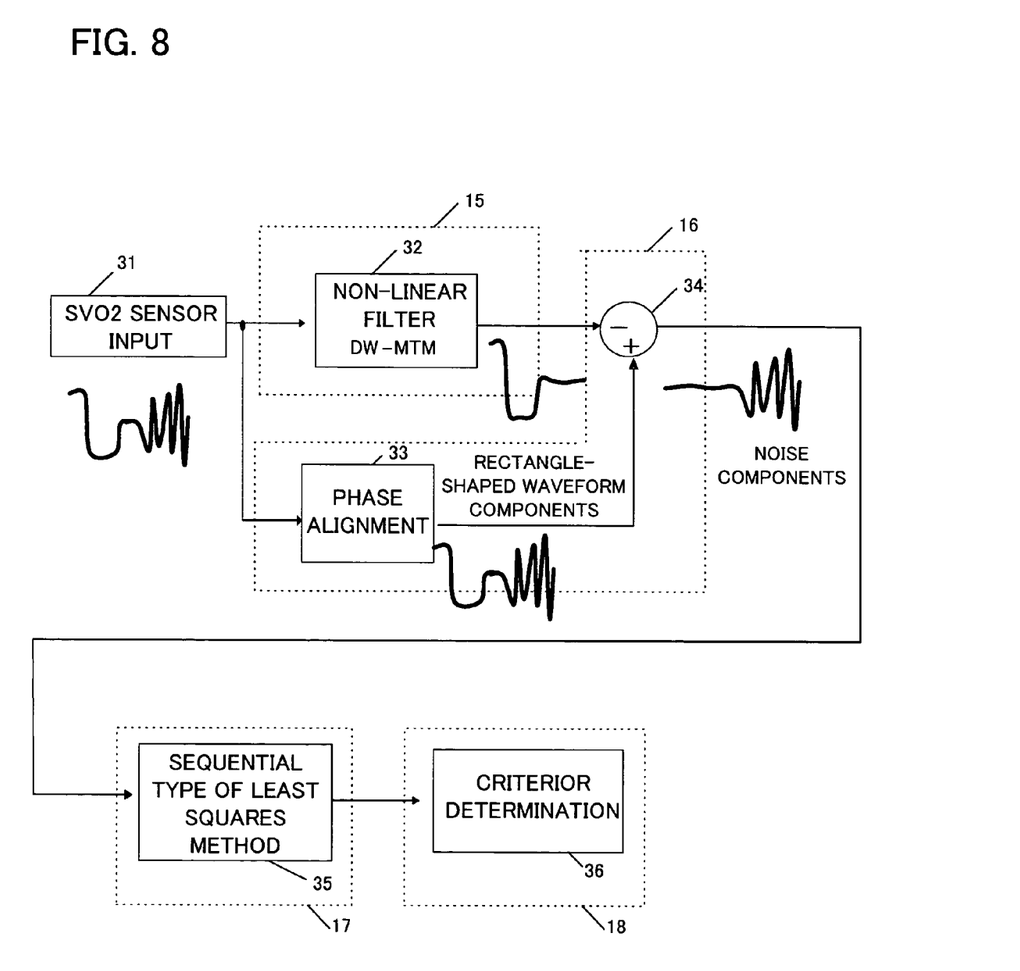
FIG. 8 is a block diagram of a catalyst deterioration determining system in accordance with one embodiment of the present invention.

FIG. 8 illustrates a process flow of a deterioration determination system in accordance with an embodiment of the present invention. The process flow relates to the rectangle extracting unit 15 through the deterioration determining unit 18 of FIG. 1. To show the correspondence with FIG. 1, the blocks used in FIG. 1 are shown by dotted lines in FIG. 8. First, the output SVO2 of the O2 sensor is input to the system (31). The input signal is filtered by the use of the non-linear filter DW-MTM, so that the rectangle component is extracted (32). The phase of the output signal is aligned with that of the filter input (33). The noise component is extracted by subtracting the rectangle component from the O2 sensor output SVO2. Next, a sequential least squares method is performed by using the square value of the extracted noise component (35). The calculated value is used as a deterioration discrimination parameter. Then, a criterion determination is performed based on the discrimination parameter (36).

The advantage of applying the least squares method is that the amount of the calculations by the ECU 10 and the required storage capacity can be minimized because the parameter is updated one after another by using the previous value and the current value. Therefore, the calculation can be performed with such an on-board CPU that has a limited processing capability and a limited storage capacity. For specifics of the sequential least squares method, reference can be made to in the above-referenced Kokai No. 2003-193898.

A criterion determining block 36 of FIG. 8 corresponds to the deterioration determining unit 18. The determination criterion for determining the deterioration of the purifier is as follows. It is observed through the experiment by the inventors that the normal catalyst and the NG catalyst can be distinguished in 1 Hz frequency domain. The determination criterion is established based on this observation. Because the discrimination parameter is obtained by squaring a time-domain signal, a square value of a time-domain signal of 1 Hz is used as the discrimination parameter. However, the parameter is not limited to such value. Any appropriate method may be selected depending on the type, the characteristics of the engine and the purifier to which the purifier deterioration determination device of the present invention is to be applied.

Figure 9:
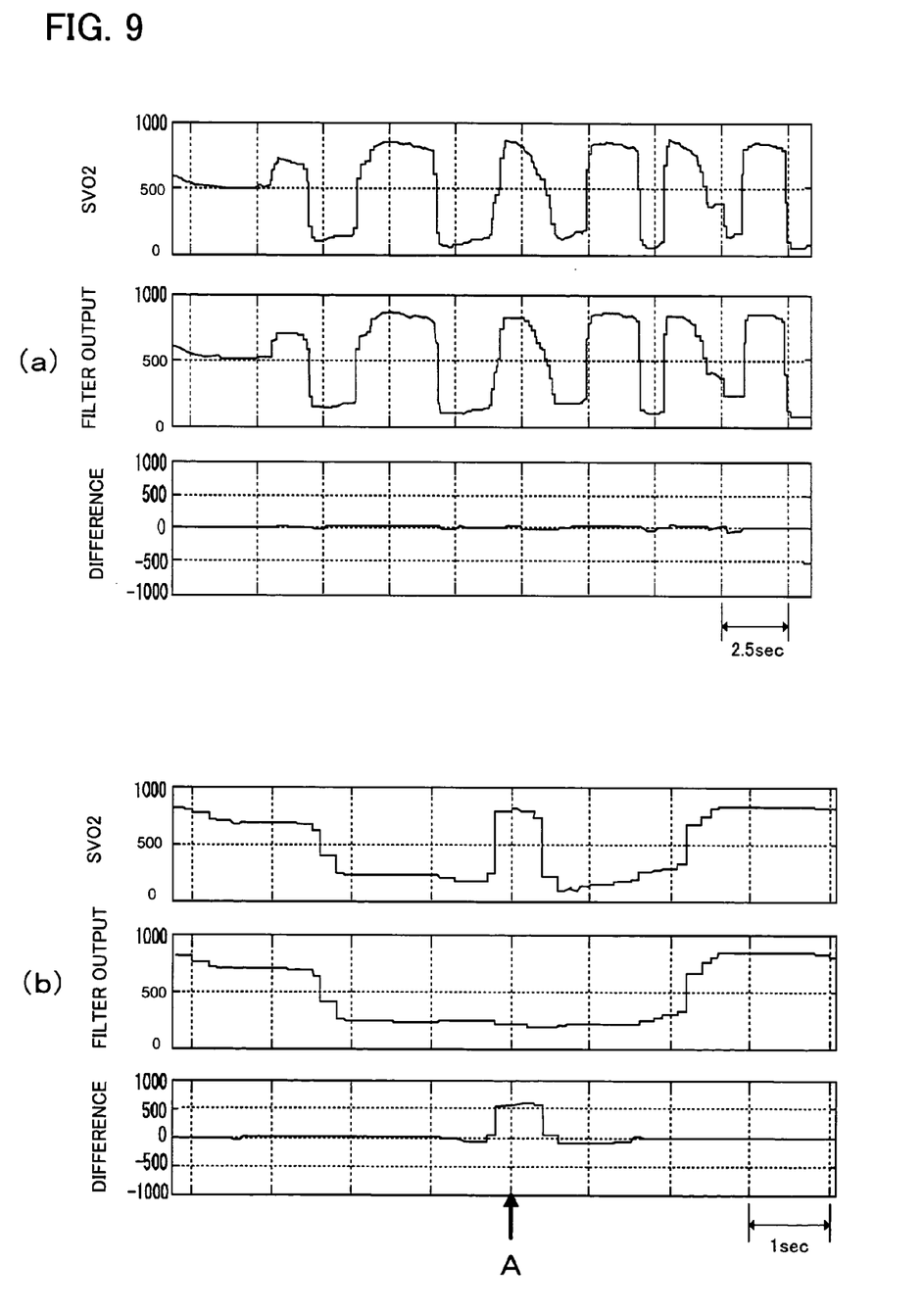
FIG. 9 shows an effect of a non-linear filtering that is used in the present invention.

FIG. 9 shows an example of the effect of the non-linear filter process. In the charts (a) and (b), the SVO2 value, the filter output value and the noise component waveform are shown from the top to the bottom. The buffer length of the measurement data shown in the charts is 1000 msec. In FIG. 9(a), the SVO2 continuously exhibits rectangle components having a relatively long period. According to the above-described characteristics of the DW-MTM filter, the waveform is preserved when the period is longer than the buffer length, or when the half period (the period in which the signal level has risen) is longer than a half length of the buffer. In this case, almost all of the SVO2 values are preserved as root waveforms, so that the filter output values exhibit almost the same waveform as the SVO2 values. Accordingly, the difference between the SVO2 value and the corresponding filter output value becomes almost zero over the whole range of the chart.

On the other hand, as for the SVO2 value in FIG. 9(b), a waveform having a period equal to or less than 1000 msec appears around the center of the chart (at a time point A). According to the characteristics of the DW-MTM filter, the waveform is not preserved when the period is less than the buffer length, or when the half period is shorter that the half length of the buffer. In this case, the waveform having a short period around the time point A does not appear in the filter output. Accordingly, the difference between the SVO2 value and the corresponding filter output has a certain value around the time point A. In contrast, the difference is almost zero in the other range.

Figure 10:
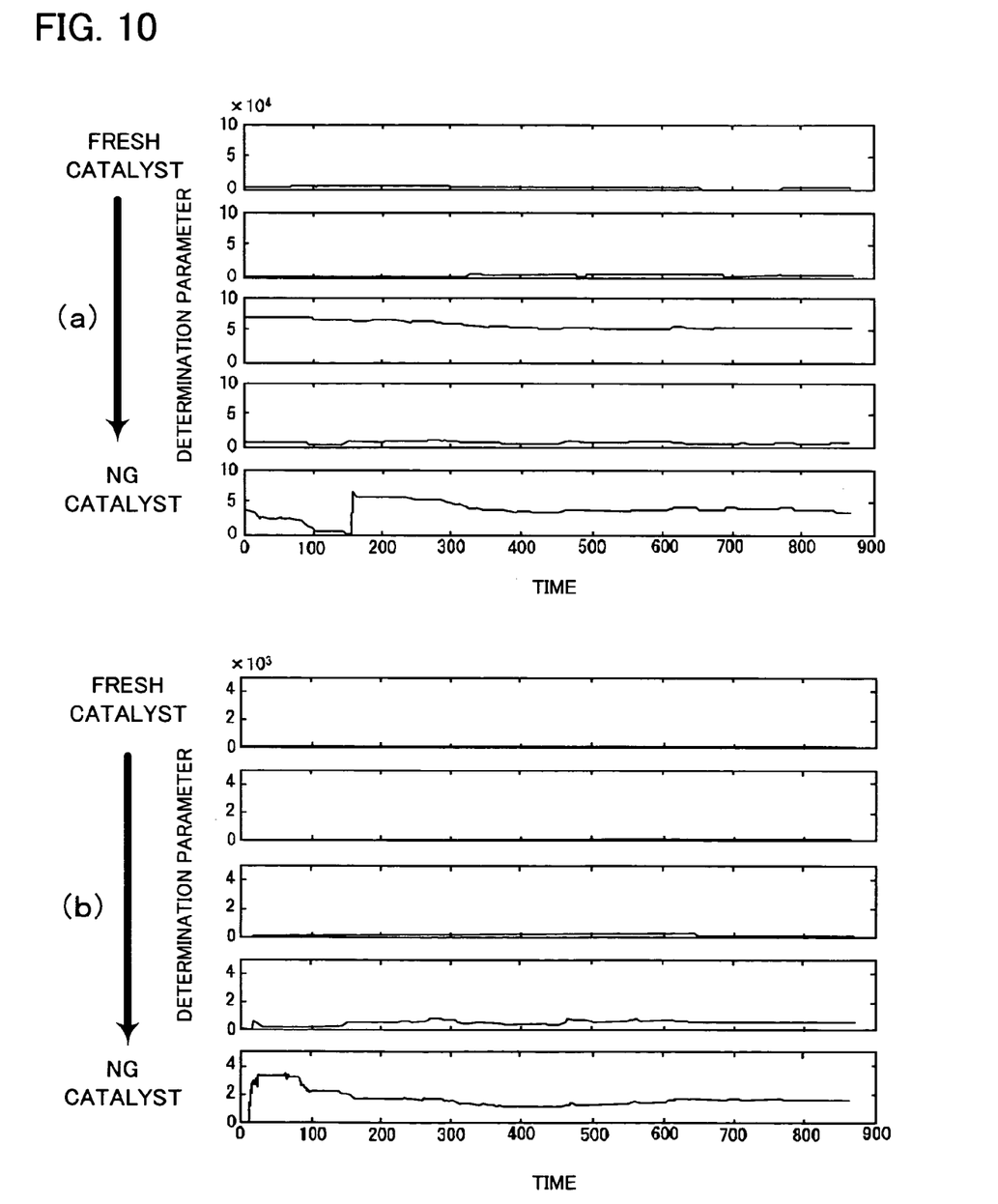
FIG. 10 schematically shows deterioration discrimination parameters through a linear filtering and deterioration discrimination parameters through a method of the present invention respectively in the order of the catalyst deterioration degrees.

FIG. 10 shows results of other experiments relating to the effect of the non-linear filter. The experiment was performed using five catalysts, each of which corresponds to a different deterioration level ranging from the fresh catalyst to the NG catalyst. Each chart of FIG. 10 indicates the result of the least squares method taking squares of the noise components extracted from the SVO2 waveform for respective catalysts. Thus, this result represents the purifier deterioration determining parameter. FIG. 10(a) shows a result of an experiment using a conventional linear filter whereas FIG. 10(b) shows a result of an experiment using the non-linear filter that is used in the present invention.

As for the third graph in FIG. 10(a), the deterioration discrimination parameter exhibits a relatively high output although the catalyst used in this case is not thoroughly fresh but is fresh enough for a normal use. That is, with the use of a conventional linear filter, discrimination parameter may take a high value even when it should not. Thus, the system fails to distinguish a normal catalyst from a NG catalyst.

On the other hand, in FIG. 10(b), almost no discrimination parameter is output as for the catalysts from the fresh one to the third one. Slightly small outputs are seen firstly in the fourth graph and sufficiently large discrimination parameters are output as for the NG catalyst at the bottom of the chart. This result indicates that the deterioration determining device in accordance with the present invention can calculate a discrimination parameter having a sufficiently significant difference between a normal catalyst and a NG catalyst, which proves a high reliability of the present invention.

Although the present invention has been described above with reference to specific embodiments, the invention is not limited to such specific embodiments.

What is claimed is:

1. A purifier deterioration determining apparatus for an internal-combustion engine having an exhaust gas purifier disposed in an exhaust pipe of the engine, and a downstream exhaust gas sensor disposed in the exhaust pipe on the downstream side of the purifier for generating outputs corresponding to components of an exhaust gas from the engine, said apparatus comprising;

means for controlling an air/fuel ratio of the engine to a predetermined value based on the outputs of the downstream exhaust gas sensor;

extracting means for performing a non-linear filtering to extract rectangle-shaped waveform components, which correspond to the normal outputs of the exhaust gas sensor, from the outputs of the downstream exhaust gas sensor during an operation under an air/fuel ratio control;

means for subtracting the rectangle-shaped waveform components from the sensor outputs to extract noise components representing a degree of the catalyst deterioration; and means for determining deterioration of the purifier.

2. The apparatus as claimed in claim 1, wherein said extracting means uses a DW-MTM filter for the non-linear filtering.

3. The apparatus as claimed in claim 1, further comprising calculating means for calculating a deterioration discrimination parameter representing the deterioration of the purifier by a sequential least squares method using square values of the noise components.

4. The apparatus as claimed in claim 1, wherein said means for determining determines the deterioration of the purifier based on the discrimination parameter.

5. The apparatus device as claimed in claim 1, wherein said means for determining sets a deterioration determination criterion equal to or larger than 1 Hz.

6. An electronic control unit for an internal combustion engine having an exhaust gas purifier disposed in an exhaust pipe of the engine, a downstream exhaust gas sensor disposed in the exhaust pipe on the downstream side of the purifier for generating outputs corresponding to components of an exhaust gas from the engine, said electronic control unit being programmed to:

control an air/fuel ratio of the engine to a predetermined value based on the outputs of the downstream exhaust gas sensor;

perform a non-linear filtering to extract rectangle-shaped waveform components, which correspond to the normal outputs of the exhaust gas sensor, from the outputs of the downstream exhaust gas sensor during an operation under an air/fuel ratio control;

subtract the rectangle-shaped waveform components from the sensor outputs to extract noise components representing a degree of the catalyst deterioration; and determine deterioration of the purifier.

7. The electronic control unit as claimed in claim 6, wherein said non-linear filtering is performed by a DW-MTM filter.

8. The electronic control unit as claimed in claim 1, further programmed to calculate a deterioration discrimination parameter representing the deterioration of the purifier by a sequential least squares method using square values of the noise components.

9. The electronic control unit as claimed in claim 1, wherein deterioration is determined based on the discrimination parameter.

10. The electronic control unit as claimed in claim 1, wherein a deterioration determination criterion is set to equal to or larger than 1 Hz.

11. An method for determining deterioration of an exhaust gas purifier disposed in an exhaust pipe of an internal combustion engine, said engine having a downstream exhaust gas sensor disposed in the exhaust pipe on the downstream side of the purifier for generating outputs corresponding to components of an exhaust gas from the engine, said method comprising the steps of:

controlling an air/fuel ratio of the engine to a predetermined value based on the outputs of the downstream exhaust gas sensor;

performing a non-linear filtering to extract rectangle-shaped waveform components, which correspond to the normal outputs of the exhaust gas sensor, from the outputs of the downstream exhaust gas sensor during an operation under an air/fuel ratio control;

subtracting the rectangle-shaped waveform components from the sensor outputs to extract noise components representing a degree of the catalyst deterioration; and determining deterioration of the purifier.

12. The method as claimed in claim 11, wherein said non-linear filtering is performed by a DW-MTM filter.

13. The method as claimed in claim 11, further comprising the step of calculating a deterioration discrimination parameter representing the deterioration of the purifier by a sequential least squares method using square values of the noise components.

14. The method as claimed in claim 11, wherein deterioration is determined based on the discrimination parameter.

15. The method as claimed in claim 11, wherein a deterioration determination criterion is set to equal to or larger than 1 Hz.

* * * * *